United States Patent
Hummelshøj

(10) Patent No.: US 12,456,075 B2
(45) Date of Patent: Oct. 28, 2025

(54) VIRTUAL IMPUTATION LEARNING FOR ONE-SIDED MATERIAL PROPERTIES

(71) Applicant: Toyota Research Institute, Inc., Los Altos, CA (US)

(72) Inventor: Jens Strabo Hummelshøj, Brisbane, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 856 days.

(21) Appl. No.: 17/582,638

(22) Filed: Jan. 24, 2022

(65) Prior Publication Data

US 2023/0237365 A1  Jul. 27, 2023

(51) Int. Cl.
*G06N 20/00* (2019.01)
*G06F 18/211* (2023.01)
*G16C 60/00* (2019.01)

(52) U.S. Cl.
CPC ........... *G06N 20/00* (2019.01); *G06F 18/211* (2023.01); *G16C 60/00* (2019.02)

(58) Field of Classification Search
CPC ....... G06N 20/00; G06F 18/211; G16C 60/00; G16C 20/30; G16C 20/70
See application file for complete search history.

(56) References Cited

U.S. PATENT DOCUMENTS 10,847,254 B2  11/2020  Aykol
2011/0145178 A1*  6/2011  Schmidtler ............ G06N 20/00
                                                          706/20

OTHER PUBLICATIONS

"Machine Learning approaches for the prediction of materials properties" Siwa Chibani et al. (hereinafter Siwa) Published Aug. 2020 (Year: 2020).*

Konno, T., "Deep-Learning Estimation of Band Gap with the Reading-Periodic-Table Method and Periodic Convolution Layer", Journal of the Physical Society of Japan, vol. 89, No. 12, May 7, 2021, pp. 1-15.

Lee, J. et al., "Prediction model of band gap for inorganic compounds by combination of density functional theory calculations and machine learning techniques", Physical Review B, vol. 93, issue 11, Mar. 2016, pp. 1-24.

Pilania, G. et al., "Multi-Fidelity Machine Learning Models for Accurate Bandgap Predictions of Solids", Computational Materials Science, vol. 129, Mar. 2017, pp. 156-163.

(Continued)

*Primary Examiner* — Pei Yong Weng
(74) *Attorney, Agent, or Firm* — Christopher G. Darrow; Darrow Mustafa PC

(57) ABSTRACT

A system for predicting a one-sided property value for one or more material candidates includes a processor and a memory communicably coupled to the processor. The memory includes a stored acquisition module and a machine learning (ML) module. The acquisition module is configured to select a training data set with a given material property. The training data set includes a first subset of materials having the material property within a predefined range and a second subset of materials having the material property outside the predefined range. Also, the ML module is configured to impute a fixed value for the material property outside the predefined range and train a ML model to predict the material property using imputed fixed value.

20 Claims, 4 Drawing Sheets

(56) References Cited

OTHER PUBLICATIONS

Im, J. et al., "Identifying Pb-free perovskites for solar cells by machine learning", npj Computational Materials, vol. 5, article No. 37, 2019, pp. 1-8.
Lu, S. et al. "Accelerated discovery of stable lead-free hybrid organic-inorganic perovskites via machine learning," Nature Communications, vol. 9, article No. 3405, 2018, pp. 1-8.
Lee et al., "Prediction model of band-gap for AX binary compounds by combination of density functional theory calculations and machine learning techniques," Physical Review B, vol. 93, 2015, pp. 1-24.

\* cited by examiner

VIRTUAL IMPUTATION LEARNING FOR ONE-SIDED MATERIAL PROPERTIES

TECHNICAL FIELD

The present disclosure relates generally to machine learning of material properties and particularly to machine learning of one-sided material properties.

BACKGROUND

The use of machine learning to assist in the discovery of new materials and/or identify properties of known materials is an ongoing field of research and development. However, some materials exhibit properties that increase the difficulty in training and executing machine learning models. For example, a material with a "one-sided property", i.e., a property that exhibits a significant change in value at a critical temperature and/or exhibits an opposite value or opposite trending value when compared to the same property for a majority of materials in the same class of materials (e.g., semiconductors, metals, conductors, among others), can result in increased difficulty in training a machine learning model to predict the material property.

The present disclosure addresses issues related to machine learning of such one-sided properties, and other issues related to machine learning.

SUMMARY

This section provides a general summary of the disclosure, and is not a comprehensive disclosure of its full scope or all of its features.

In one form of the present disclosure, a system for predicting at least one property for one or more materials includes a processor and a memory communicably coupled to the processor and storing machine-readable instructions that, when executed by the processor, cause the processor to: (1) select a training data set from a candidate data set by applying a training function to the candidate data set, the training data set including a first subset of material candidates each having a property within a predefined range and a second subset of material candidates each having the material property outside the predefined range; (2) impute a fixed value for the material property outside the predefined range for the second subset of material candidates; and (3) predict, based at least in part on values of the material property with the predefined range and the imputed fixed value, the material property for material candidates in the candidate data set and not in the training data set.

In another form of the present disclosure, a system for predicting at least one property for one or more material candidates includes a processor and a memory communicably coupled to the processor. The memory includes a stored acquisition module with instructions that when executed by the processor cause the processor to select a training data set from a candidate data set by applying a training function to the candidate data set. The training data set includes data for a first subset of material candidates each having a property within a predefined range and data for a second subset of material candidates each having the material property outside the predefined range. The memory also includes a stored machine learning module with instructions that when executed by the processor cause the processor during each of one or more iterations, to: (1) impute a fixed value for the material property outside the predefined range for the second subset of the material candidates; (2) train a machine learning model using the material property for the first subset of material candidates and the imputed fixed value for the second subset of material candidates; and (3) predict, based at least in part on values of the material property within the predefined range and the imputed fixed values, the material property for material candidates in the candidate data set, and not in the training data set, that have the material property within the predefined range. In some variations, the memory includes a stored output module with instructions that when executed by the processor cause the processor to identify material candidates in the candidate data set with the material property outside the predefined range.

In still another form of the present disclosure, a method includes selecting training data from a candidate data set by applying a training function to the candidate data set. The training data set includes data for a first subset of material candidates having a material property within a predefined range and data for a second subset of material candidates having the material property outside the predefined range. Also, the material property is selected from the group consisting of electronic bandgap, thermal expansion, and electrical resistivity. The method also includes imputing a fixed value for the material property outside the predefined range for the second subset of material candidates, predicting, based at least in part on values of the material property within the predefined range and the imputed fixed value, the material property for material candidates in the candidate data set, and not in the training data set, having the material property within the predefined range, and identifying material candidates in the candidate data set with the material property outside the predefined range.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides a machine learning (ML) system and a ML method for predicting a material property by training a ML model using an imputed fixed value for a one-sided material property. As used herein, terms such as "property" and phrases such as "material property", "the property", and "predicting the property" refer to a property exhibiting by a material (e.g., electronic bandgap; also referred to herein simply as "bandgap") and a value for the property. Also, as used herein, the phrase "one-sided material property" and "one-sided property" refers to a property of a material that has a subset of values that are out of the norm for values of the property. Stated differently, a one-sided property of a material exhibits unexpected property value(s), unexpected change in property value(s), and/or unexpected trends of a property value(s) compared to values of the same property for a majority of materials within the same class of materials. Non-limiting examples of a one-sided property, i.e., of a material with a one-sided property, include a material with negative bandgap, a material with negative thermal expansion with increasing temperature, and a material with a step or discontinuous reduction in electrical resistivity at a critical temperature.

Figure 1:
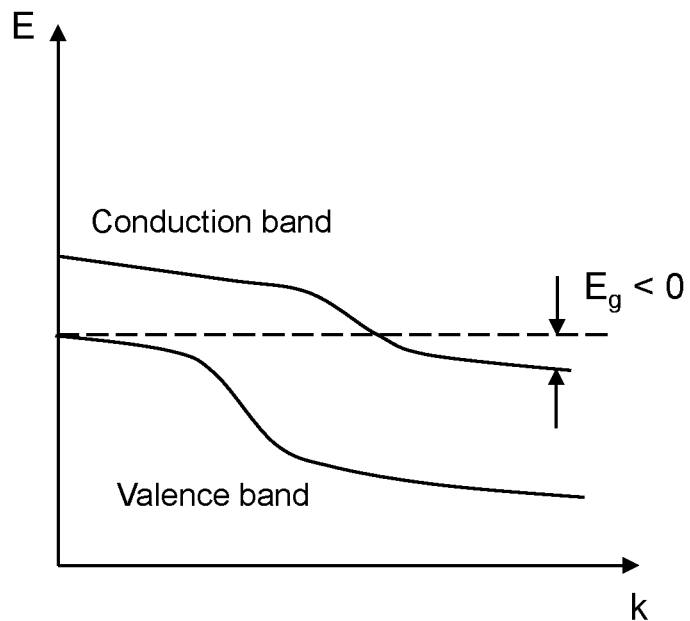
FIG. 1 shows a plot of energy versus crystal momentum for a material with a negative electronic bandgap.
Figure 2:
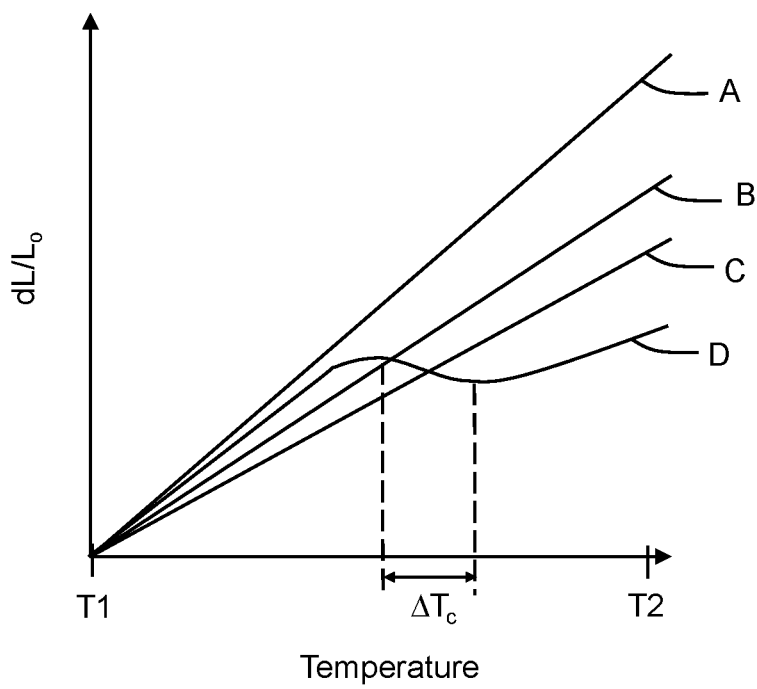
FIG. 2 shows a plot of linear thermal expansion versus temperature for three materials (A, B, C) that exhibit a continuous increase in linear thermal expansion with increasing temperature and one material (D) that exhibits a decrease in linear thermal expansion between T1 and T2.
Figure 3:
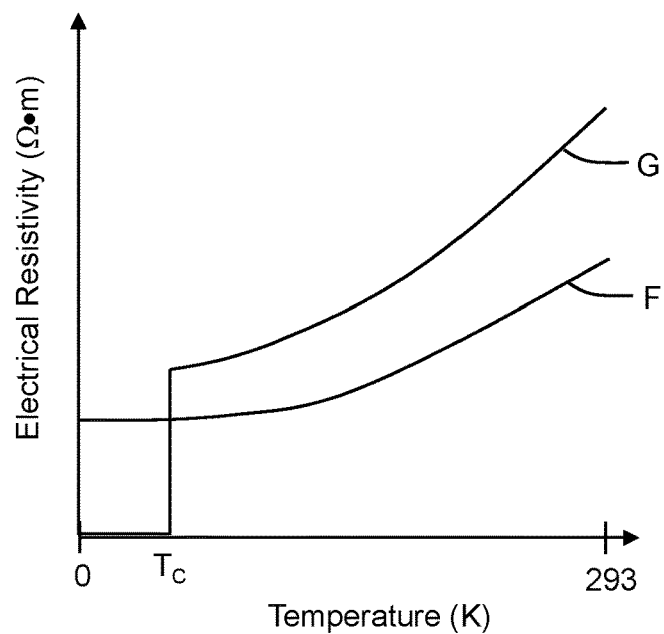
FIG. 3 shows a plot of one material (F) that exhibits a continuous decrease in electrical resistivity with decreasing temperature between 293 K and 0 K, and another material (G) that exhibits a discontinuous decrease in electrical resistivity at a critical temperature ($T_c$) between 293 K and 0 K.

Referring to FIGS. 1-3, examples of one-side properties are shown in the form of a negative bandgap (FIG. 1), a negative thermal expansion (FIG. 2), and a step or discontinuous reduction in electrical resistivity at or below a critical temperature (FIG. 3). Referring particularly to FIG. 1 a plot for a material with a negative bandgap (i.e., a one-sided property) is shown. As used herein, the term "bandgap" refers to the energy difference (in electron volts) between the top of the valence band and the bottom of the conduction band in insulators and semiconductors. In addition, it should be understood that most materials with a bandgap exhibit or have a positive bandgap and thus training a ML model with material candidates exhibiting bandgap values less than zero (i.e., out of the norm) can increase the difficulty and complexity of training the ML model compared to using only material candidates exhibiting bandgap values greater than zero. However, it should also be understood that materials with negative bandgaps (i.e., semimetals) are used in electrochemical cells, the transmission of electricity, and the production of nuclear power, and thus discovering or identifying materials with a negative bandgap can be desirable. Non-limiting examples of materials with a negative bandgap include arsenic, antimony, bismuth, a-tin (gray tin) and graphite, among others.

Referring particularly to FIG. 2, a graphical plot of linear thermal expansion ($dL/L_o$) as a function of temperature from T1 to T2, with T2 greater than T1 (i.e., T1<T2), is shown. And while three materials 'A', 'B', and 'C' exhibit a continuous increase in $dL/L_o$ from T1 to T2 (also known as a "positive thermal expansion"), material 'D' exhibits a decrease in $dL/L_o$ within a critical temperature range '$\Delta T_c$' between T1 and T2 (also known as a "negative thermal expansion"). Non-limiting examples of materials with a negative thermal expansion include zirconium tungstate ($ZrW_2O_8$), $HfV_2O_7$, and $ZrV_2O_7$, among others. It should be understood that the majority of materials have a positive thermal expansion and thus training a ML model with material candidates exhibiting a negative thermal expansion (i.e., out of the norm) can increase the difficulty and complexity of training the ML model compared to using only material candidates exhibiting positive thermal expansion.

Referring particularly to FIG. 3, a graphical plot of electrical resistivity as a function of temperature from room temperature (293 K) to 0 K is shown. And while one of the materials 'F' exhibits a continuous decrease in electrical resistivity with decreasing temperature, material 'G' exhibits a stepped or discontinuous decrease in electrical resistivity at or below a critical temperature '$T_c$'. That is, material G is a high temperature superconductor that exhibits superconductivity below $T_c$. Examples of materials with a stepped or discontinuous decrease in electrical resistivity (i.e., high temperature superconductors) include bismuth strontium calcium copper oxide (BSCCO) and yttrium barium copper oxide (YBCO), among others. It should be understood that the majority of materials have a continuous decrease in electrical resistivity with decreasing temperature and thus training a ML model with material candidates exhibiting a stepped or discontinuous decrease in electrical resistivity at or below a critical temperature '$T_c$' (i.e., out of the norm) can increase the difficulty and complexity of training the ML model compared to using only material candidates exhibiting a continuous decrease in electrical resistivity with decreasing temperature.

Figure 4:
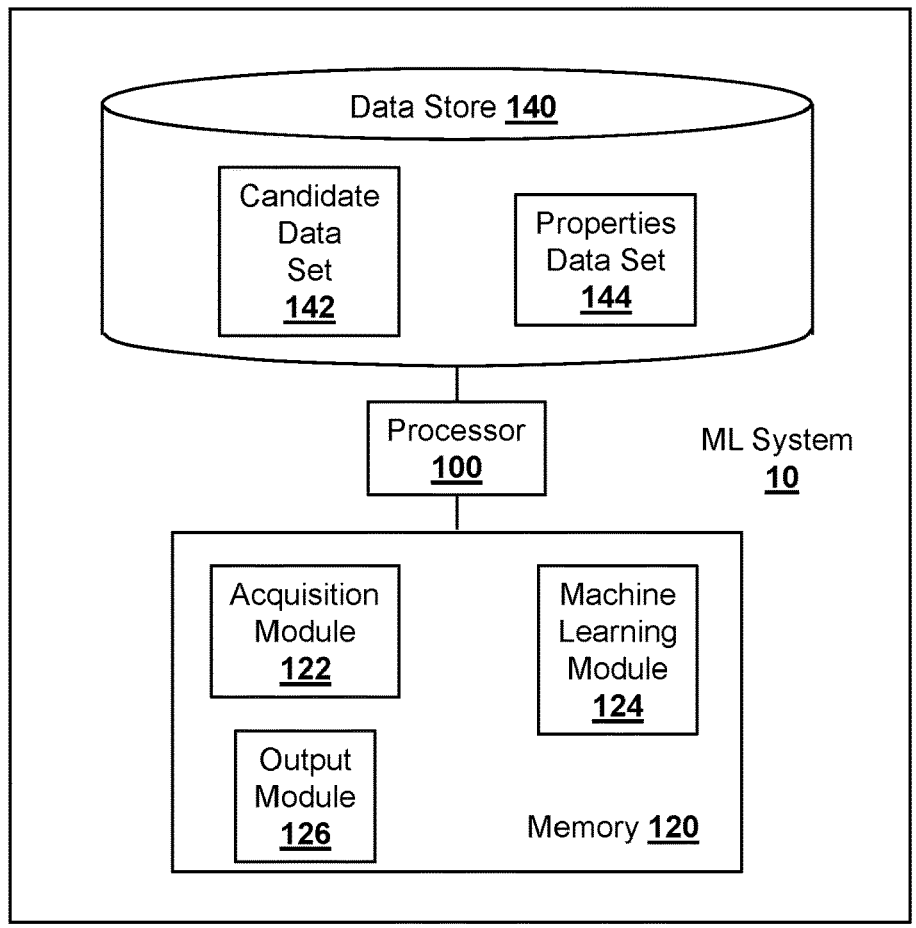
FIG. 4 illustrates an example of a machine learning system for predicting material properties according to the teachings of the present disclosure.

Referring now to FIG. 4, a ML system 10 for predicting a property for one or more material candidates is illustrated. The ML system 10 is shown including at least one processor (referred to herein simply as "processor") 100, and a memory 120 and a data store 140 communicably coupled to the processor 100. It should be understood that the processor 100 can be part of the ML system 10, or in the alternative, the ML system 10 can access the processor 100 through a data bus or another communication path.

The memory 120 is configured to store an acquisition module 122, a ML module 124, and an output module 126. The memory is a random-access memory (RAM), read-only memory (ROM), a hard-disk drive, a flash memory, or other suitable memory for storing the acquisition module 122, ML module 124, and output module 126. Also, the acquisition module 122, ML module 124, and output module 126 are, for example, computer-readable instructions that when executed by the processor 100 cause the processor to perform the various functions disclosed herein.

In some variations the data store 140 is a database, e.g., an electronic data structure stored in the memory 120 or another data store. Also, in at least one variation the data store 140 in the form of a database is configured with routines that can be executed by the processor 100 for analyzing stored data, providing stored data, organizing stored data, and the like. Accordingly, in some variations the data store 140 stores data used by the acquisition module 122, the ML module 124, and/or the output module 126. For example, and as shown in FIG. 4, in at least one variation the data store stores a candidate data set 142 and a properties data set 144. In some variations the candidate data set 142 includes a listing of a plurality of materials and the properties data set 144 includes at least one property for at least a subset of the plurality of materials in the candidate data set 142. It should be understood that the at least one property in the properties data set 144 is properly tagged and/or associated with the plurality of materials in the candidate data set 142.

Non-limiting examples of materials in the candidate data set 142 include polymers, metals, intermetallics, semiconductors, insulators, ceramics, and combinations thereof (e.g., ceramic matrix composites and metal matrix composites, among others). In some variations, the property data set 144 includes at least one property for at least a subset of the plurality of materials, while in other variations the properties data set 144 includes at least two properties for at least a subset of the plurality of materials. In at least one variation, the property data set 144 includes at least three properties for at least a subset of the plurality of materials, for example, four or more, five or more, or six and more different properties for at least a subset of the plurality of materials in the candidate data set 112. Non-limiting examples of properties in the property data set 144 include bandgap, thermal expansion, and electrical resistivity, among others. In addition, the property data set can include chemical compositions, impurity concentrations, and processing conditions, among others, for at least a subset of the plurality of materials in the candidate data set 112.

The acquisition module 122 can include instructions that function to control the processor 100 to select a training data set from the candidate data set 112. For example, in some variations the acquisition module 122 includes instructions that function to control the processor 100 to select a training data set that includes a first subset of material candidates that each have a property within a predefined range and a second subset of material candidates that each have the property outside of the predefined range. And in at least one variation the property outside of the predefined range is a one-sided property. Accordingly, in some variations the acquisition module 122 includes instructions that function to control the processor 100 to select a training data set that includes a first subset of material candidates that each do not have a one-sided property and a second subset of material candidates that each have a one-side property.

In at least one variation, the acquisition module 122 includes instructions that function to control the processor 100 to select the training data set from the candidate data set 112 by applying a training function to the candidate data set 112. Non-limiting examples of the training function include instructions to select the training data set based on a random selection, an expert analysis, and/or identified material candidates from the output module 126.

The ML module 124 includes instructions that function to control the processor 100 to impute a fixed value for the one-sided property for each of the material candidates in the second subset of material candidates. In addition, the ML module 124 includes instructions that function to train a ML model (algorithm) using the property value for the first subset of material candidates and the imputed fixed value for the second subset of material candidates. It should be understood that the imputed fixed value is not used to replace missing data (i.e., missing property values), but to clamp one-sided property values with a fixed value. Non-limiting examples of the ML model include supervised ML models such as nearest neighbor models (algorithms), Naïve Bayes models, decision tree models, linear regression models, support vector machine (SVM) models, and neural network models, among others. And in at least one variation, the ML model is Gaussian Process regression model.

One sample of Python code for imputing the fixed value for the second subset of material candidates is:

```
pred = self(test_x)
mu = self.likelihood(pred).mean
if self.fit_zeros:
    mu = mu.clamp_min(0)
```

And one sample of Python code for training ML model (algorithm) using the property value for the first subset of material candidates and the imputed fixed value for the second subset of material candidates is:

```
if fit_zeros:
    zero_count = torch.where(train_y == 0)[0].shape [0]
    if zero_count == 0:
        fit_zeros = False
    else:
        i = train_y.argsort( )
        train_y = train_y[i]
        train_x = train_x[i]
        y0 = train_y[:zero_count]
        y1 = train_y[zero_count:]
        y0 = y0.contiguous( )
        y0 -= torch.rand(y0.shape, device=y0.device)
        y0.requires_grad = True
        self.y0 = y0
        train_y = torch.cat((y0, y1))
for lr in lrs:
    optimizer = Opt([
        {'params': list(model.parameters( )) + ([y0] if fit_zeros else [])}
    ], lr=lr)
    # Find optimal model hyperparameters and embeddings
    for it in range(niter):
        # Zero gradients from previous iteration
        optimizer.zero_grad( )
        if fit_zeros:
            train_y = torch.cat((y0.clamp_max(0), y1))
        # Output from model
        p = model(train_x)
        loss = cost(p, train_y)
        loss.backward( )
        if (it+1) % every == 0:
            logger(lr, it, niter, loss)
        optimizer. step( )
```

Training the ML model provides for predictions of the at least one material property value for the first subset of material candidates to be within a desired value (i.e., less than or equal to a desired value) of a cost function. In addition, the trained ML model is configured to predict the property for material candidates in the candidate data set 112 and not in the training data set. And while the ML model is trained using the imputed fixed value for the second subset of material candidates (i.e., the material candidates with a one-sided property), in some variations the ML model predicts a one-sided property value during training for a material candidate in the second subset (i.e., in subsequent iterations after imputing the fixed value). And in at least one variation, the ML predicts which material candidates in the candidate data set 112, and not in the training data set, exhibit or have the one-sided property. That is, after training the ML model, the ML module 124 is configured to predict which material candidates in the candidate data set 112, and not in the training data set, exhibit or have the one-sided property, and to predict values for the material property for the material candidates (not in the training data set) that do not exhibit or have the one-sided property.

Figure 5:
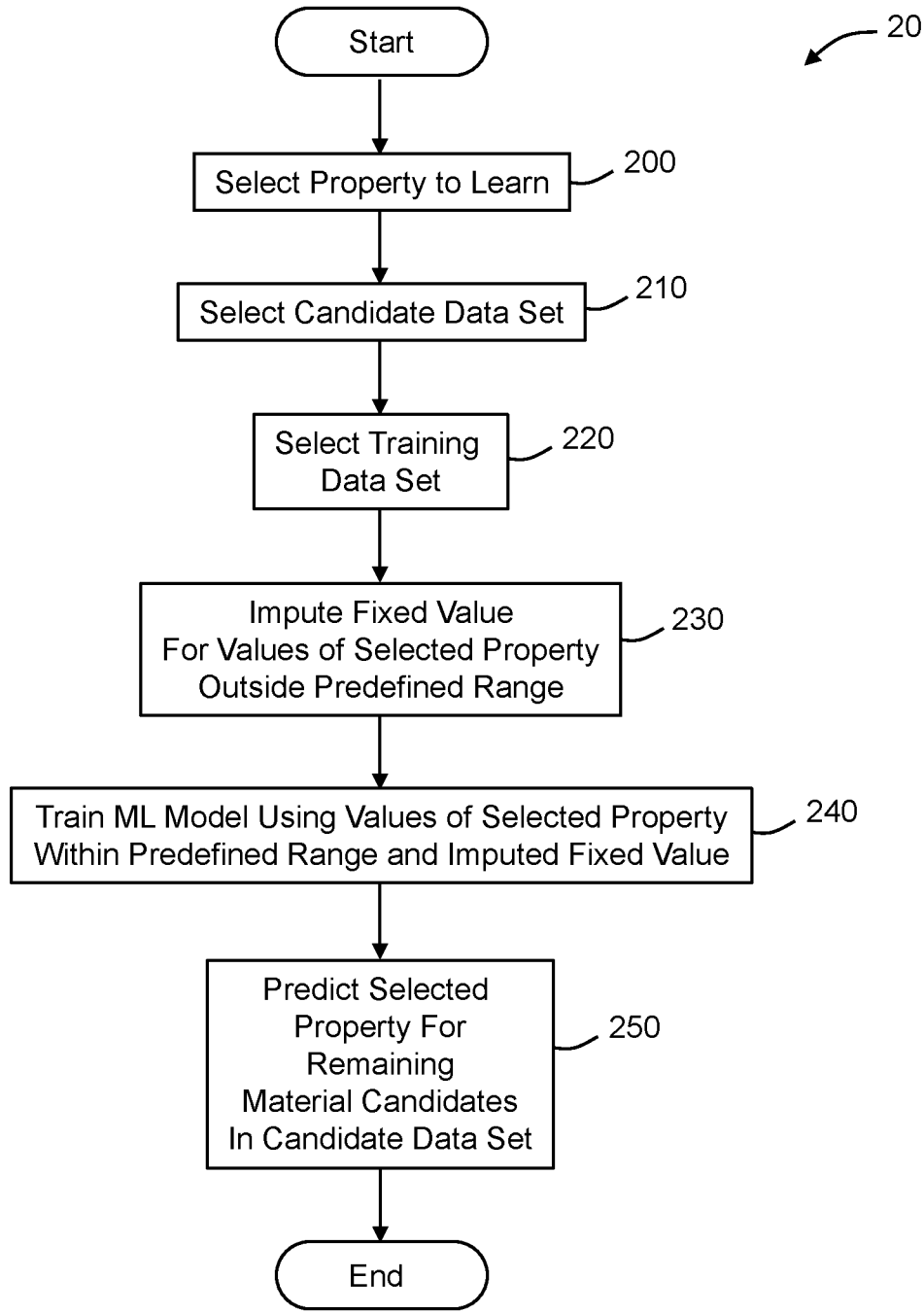
FIG. 5 shows a flow chart for a machine learning method using the system illustrated in FIG. 4 to predict material properties according to the teachings of the present disclosure.

Referring now to FIG. 5, a flow chart for a ML method 20 is shown. The ML method 20 includes selecting a material property to learn at 200, selecting a candidate data set with a plurality material candidates at 210, and selecting a training data set at 220. In some variations the training data set is selected from the candidate data set by applying a training function to the candidate data set. And in such variations the training function can include instructions to select the training data set based on at least one of a random selection, an expert analysis, and identified material candidates from the output module 126 of the ML system 10 discussed above.

In at least one variation the training data set selected at 220 includes at least a first subset of material candidates for which values of the selected material property are within a predefined range and a second subset of material candidates for which values of the selected material property outside the predefined range. That is, the selected material property of the material candidates in the second subset exhibit or have a one-side property.

After selecting the training data set at 220, the ML method 20 determines which of the material candidates have the selected material property with values outside the predefined range, and imputes a fixed value for the values of the selected material property that are outside the predefined range at 230. Stated differently, the ML method 20 imputes a fixed value for the one-sided property of the material candidates in the training data set that exhibit or have the one-sided property.

In some variations the selected material property is bandgap, the predefined range of the selected material property is greater than zero (e.g., between 0.0 and 10.0 eV) and outside the predefined range is less than zero. And in such variations the imputed fixed value can be zero such that ML method clamps a negative bandgap value to zero for each material candidate in the training data set that exhibits or has a negative bandgap. In other variations the selected material property is thermal expansion, the predefined range of the selected material property is $(dL/L_o)/dT$ greater than zero, and outside the predefined range is $(dL/L_o)/dT$ less than zero. And in such variations the fixed value can be $(dL/L_o)/dT$ equal to zero such that the ML method 20 clamps a negative thermal expansion value to zero for each material candidate in the training data set that exhibits or has a negative thermal expansion. And in at least one variation, the selected material property is electrical resistivity, the predefined range of the selected material property is electrical resistivity greater than a predefined value (e.g., greater than $10^{-11}$ Ω·m), and outside the predefined range is electrical resistivity equal to about 0.0 Ω·m. And in such variations the fixed value can be electrical resistivity equal to $10^{-11}$ Ω·m such that the ML method 20 clamps a zero electrical resistivity to $10^{-11}$ Ω·m for each material candidate in the training data set that exhibits or has superconductor behavior.

At 240, the ML method 20 trains a ML model using the material candidates with the selected property having values within the predefined range and the material candidates having the imputed fixed value. It should be understood that training the ML model with the material candidates with the selected property having values within the predefined range and the material candidates having the imputed fixed value enhances the learning of the ML model.

The ML method 20 then proceeds to 250 where the selected property is predicted for remaining material candidates in the candidate data set, i.e., material candidates not in the training data set. In some variations the ML method 20 predicts which, if any, of the remaining material candidates exhibit or have the one-sided property. And in at least one variation the ML method 20 predicts a value for the one-side property for the remaining material candidates that exhibit or have the one-sided property.

Figure 6:
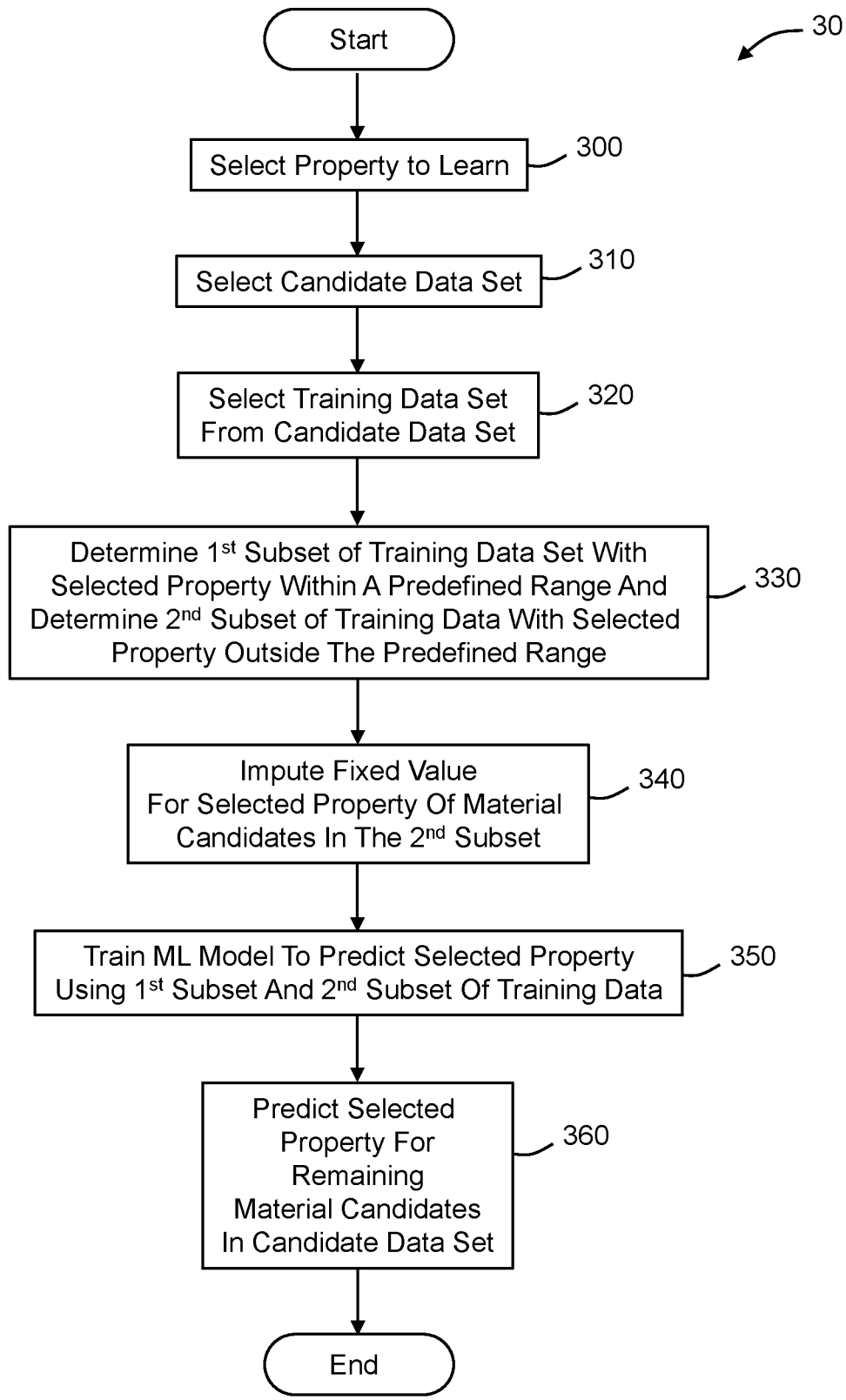
FIG. 6 shows a flow chart for another machine learning method using the system illustrated in FIG. 4 to material properties according to the teachings of the present disclosure.

Referring now to FIG. 6, a flow chart for another ML method 30 is shown. The ML method 30 includes selecting a material property to learn at 300, selecting a candidate data set with a plurality material candidates at 310, and selecting a training data set at 320. In some variations the training data set is selected from the candidate data set by applying a training function to the candidate data set. And in such variations the training function can include instructions to select the training data set based on at least one of a random selection, expert analysis, and identified material candidates from the output module 264 of the ML system 10 discussed above.

After selecting the training data set at 320, the ML method 30 determines a first subset of the training data for which material candidates exhibit or have the selected property within a predefined range of values and a second subset of the training for which material candidates exhibit or have the selected property outside the predefined range of values at 330. Stated differently, the ML method 30 determines which of the material candidates in the training data set exhibit or have the one-sided property. The ML method 30 then imputes a fixed value for the selected property of the material candidates in the second subset at 340 such that the ML method 30 clamps the one-sided property values for the material candidates in the second subset. And as noted above, in some variations the selected material property is bandgap and the imputed fixed value is zero, in other variations the selected material property is thermal expansion and the imputed fixed value is $(dL/L_o)/dT$ equal to zero, and in at least one variation, the selected material property is electrical resistivity the imputed fixed value is electrical resistivity equal to $10^{-11}$ Ω·m.

At 350, the ML method 30 trains a ML model using the material candidates in the first subset and the second subset of the training data set and then predicts the selected property for the remaining material candidates in the candidate data set. In some variations the ML method 30 predicts which, if any, of the remaining material candidates exhibit or have the one-sided property. And in at least one variation the ML method 30 predicts a value for the one-side property for the remaining material candidates that exhibit or have the one-sided property.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value.

And in at least one variation, such known commercial and/or experimental measurement tolerances are +/−1% of the measured value.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A system comprising:
a processor; and
a memory communicably coupled to the processor and storing an acquisition module and machine learning (ML) module with machine-readable instructions that, when executed by the processor, cause the processor to:
select a training data set from a candidate data set via the machine-readable instructions of the acquisition module, the training data set including a first subset of material candidates each having a material property within a predefined range and a second subset of material candidates each having a one-sided material property outside the predefined range; and
via the machine readable instructions of the ML module:
impute a fixed value for the material property outside the predefined range for the second subset of material candidates;
train a ML model with the first subset of material candidates and the second subset of material candidates with the imputed fixed value; and
predict, using the trained ML model, the material property for materials having the material property within the predefined range and materials having the one-side material property outside the predefined range.

2. The system according to claim 1, wherein the prediction of the material property for the material candidates in the candidate data set and not in the training data set includes predicting the material property within the predefined range.

3. The system according to claim 2, wherein the prediction of the material property for the material candidates in the candidate data set and not in the training data set further includes predicting the one-sided material property outside the predefined range.

4. The system according to claim 1, wherein the material property within the predefined range comprises values of the material property equal to or greater than zero and the one-sided material property outside the predefined range comprises values of the material property less than zero.

5. The system according to claim 1, wherein the machine-readable instructions, when executed by the processor, further cause the processor to identify material candidates in the candidate data set with the one-sided material property outside the predefined range.

6. The system according to claim 5, wherein the machine-readable instructions, when executed by the processor, further cause the processor to select the training data set from the candidate data set by applying a training function to the candidate data set, the training function being at least one of a random selection, an expert analysis, and the identified material candidates in the candidate data set with the one-sided material property outside the predefined range.

7. The system according to claim 1, wherein the material property and the one-sided material property are at least one of electronic bandgap, thermal expansion, and electrical resistivity.

8. The system according to claim 1, wherein the ML model comprises at least one of a nearest neighbor model, a Naïve Bayes model, a decision tree model, linear regression model, support vector machine model, and a neural network model.

9. The system according to claim 1, wherein the material property is electronic bandgap and the imputed fixed value for the second subset of material candidates is zero.

10. The system according to claim 1, wherein the material property is thermal expansion and the imputed fixed value for the second subset of material candidates is zero.

11. The system according to claim 1, wherein the material property is electrical resistivity and the imputed fixed value for the second subset of material candidates is $10^{-8}$.

12. The system according to claim 1, wherein the training data set further comprises a chemical composition of each of the material candidates.

13. The system according to claim 12, wherein the material property is electronic bandgap, and the imputed fixed value for the second subset of material candidates is zero.

14. A system comprising:
a processor; and
a memory communicably coupled to the processor, the memory storing:
an acquisition module including machine-readable instructions that when executed by the processor cause the processor to select a training data set from a candidate data set by applying a training function to the candidate data set via the machine-readable instructions, the training data set including data for a first subset of material candidates each having at least one material property within a predefined range and data for a second subset of material candidates each having a one-sided material property outside the predefined range;
a machine learning (ML) module including additional machine-readable instructions that when executed by the processor cause the processor during each of one or more iterations, to:
impute a fixed value for the one-sided material property outside the predefined range for the second subset of material candidates;
train a ML model using the at least one material property for the first subset of material candidates and the imputed fixed value for the second subset of material candidates; and
predict, based at least in part on values of the material property with the predefined range and the imputed fixed value, the material property for material candidates in the candidate data set, and not in the training data set, that have the material property within the predefined range; and
an output module including machine-readable instructions that when executed by the processor cause the processor to identify material candidates in the candidate data set with the one-sided material property outside the predefined range.

15. The system according to claim 14, wherein the prediction of the material property for the material candidates in the candidate data set and not in the training data set further includes predicting the material property for material candidates having the one-sided material property outside the predefined range.

16. The system according to claim 14, wherein the material property is at least one of electronic bandgap, thermal expansion, and electrical resistivity.

17. The system according to claim 14, wherein the material property is at least one of electronic bandgap and thermal expansion, and the imputed fixed value for the second subset of material candidates is zero.

18. A method comprising:
selecting, using a processor directed by machine readable instructions in an acquisition module, a training data set from a candidate data set, the training data set including data for a first subset of material candidates each having a material property within a predefined range and data for a second subset of material candidates each having a one-sided material property outside the predefined range;

imputing a fixed value for the one-sided material property outside the predefined range for the second subset of material candidates;

predicting, using the processor directed by machine readable instructions in a trained machine learning module and based at least in part on values of the material property within the predefined range and the imputed fixed value, the material property for material candidates in the candidate data set, and not in the training data set, having the material property within the predefined range; and identifying material candidates in the candidate data set with the one-sided material property outside the predefined range.

19. The method according to claim 18, wherein the material property is an electronic bandgap, the material property within the predefined range is the electronic bandgap greater than or equal to zero, the material property outside the predefined range is the electronic bandgap less than zero, and the imputed fixed value is zero.

20. The method according to claim 18 further comprising predicting the material property for material candidates having the one-sided material property outside the predefined range.

* * * * *